United States Patent [19]

Lee et al.

[11] Patent Number: 4,998,244
[45] Date of Patent: Mar. 5, 1991

[54] HIGH SPEED MODULE INTERCONNECTION BUS

[75] Inventors: Craig A. Lee, Tamarac; David B. Fallin; Edward J. Sackman, III; Donald L. Wray, of Sunrise; all of Fla.

[73] Assignee: Racal Data Communications Inc., Sunrise, Fla.

[21] Appl. No.: 380,945

[22] Filed: Jul. 17, 1989

[51] Int. Cl.$^5$ .............................................. H04J 3/12
[52] U.S. Cl. .................................. 370/85.1; 370/85.11
[58] Field of Search ................... 370/85.1, 85.2, 85.6, 370/85.9, 89.11, 85.12, 85.4, 85.5, 85.7, 85.8, 110.1; 340/825.5

[56] References Cited

U.S. PATENT DOCUMENTS

| | | |
|---|---|---|
| 4,451,881 | 5/1984 | Grice et al. |
| 4,536,873 | 8/1985 | Leete .............................. 370/85.11 |
| 4,580,261 | 4/1986 | Pelotte ........................... 370/85.11 |
| 4,700,341 | 10/1987 | Huang . |
| 4,718,061 | 1/1988 | Turner ............................. 370/85.6 |

OTHER PUBLICATIONS

*Computer Networks*, by Andrew Tanenbaum, 1981, Prentice-Hall, Inc., pp. 296–307.
*IEEE Communications Magazine*, Apr. 1988, vol. 26, No. 4, pp. 20–28, "The QPSX Man", by R. M. Newman et al.

Primary Examiner—Douglas W. Olms
Assistant Examiner—Melvin Marcelo
Attorney, Agent, or Firm—Jerry A. Miller

[57] ABSTRACT

A method and apparatus for providing communication among N modules connected to a common communication bus uses a bus structure with a reserve line for signaling the occurrence of a reservation time slot during which time each of the N modules which have information to transmit may reserve a time for transmission over the bus. A plurality of at least N data lines are used for transmission of data words over the bus. Each of the N modules are also assigned use of one of the plurality of data lines for signaling during the reservation time slot that the module has information to transmit over the bus. The reserve line is also used for signaling, that a word of data being transmitted over the plurality of data lines is a last word in a current transmission to be transmitted by the module currently transmitting.

12 Claims, 10 Drawing Sheets

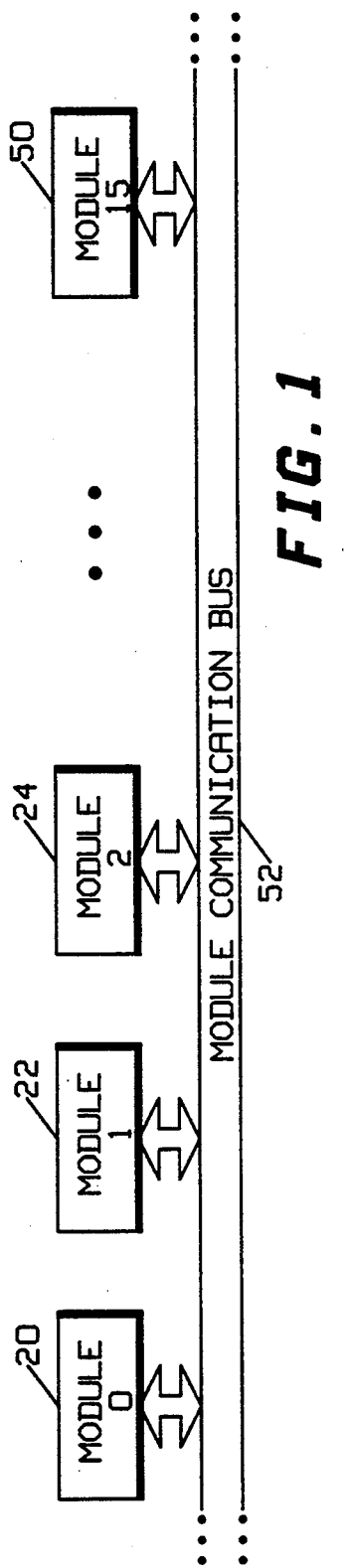
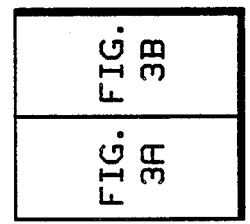
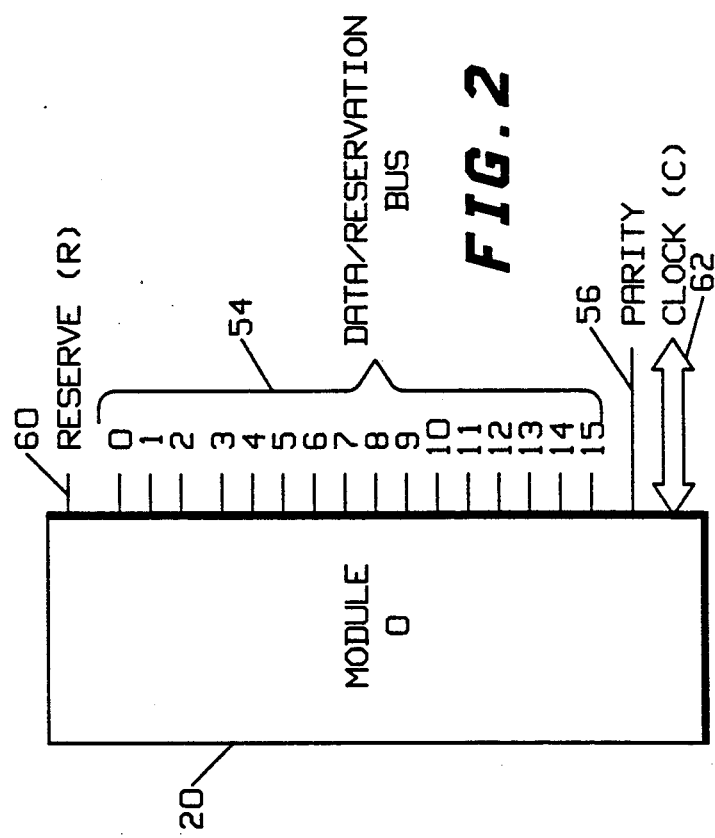

FIG. 3A  * MODULE 13 FAILURE

HIGH SPEED MODULE INTERCONNECTION BUS

BACKGROUND

1. Field of the Invention

This invention relates generally to the field of high speed packetlike data communication between interconnected electronic modules such as, for example, circuit cards within a single card cage. More particularly, this invention relates to a method and apparatus for providing for transport of high speed ATM (Asynchronous Transfer Mode) data cells (packets) between such modules without requiring a master module.

2. Background of the Invention

With the evolution of modern data communication equipment and increased complexity of data communication networks, large numbers of rack or card cage mounted data communications circuits such as modems, DSU's (Digital Service Units), multiplexers and the like frequently require the ability to communicate with one another and transport data to and from one another. To avoid large arrays of complex and expensive cable interconnection, such devices are sometimes interconnected via a common backplane communication bus.

Unfortunately, when speeds on the bus approach several hundred megabits per second, the use of conventional time multiplexing techniques becomes impractical due to difficulties involved with configuration and maintenance of time slot lists associated with the specific connections as well as synchronization of these lists on modules throughout the system. Similarly, conventional packet based systems require an undue amount of overhead and some type of contention mechanism or deterministic slot assignment is required to allow orderly access to the bus while providing load balancing.

Numerous protocols have been developed for use in local and wide area networks to provide similar load balancing and slot allocation functions. One such system is described in *Computer Networks*, by Andrew Tanenbaum, 1981, Prentice-Hall, Inc., pp 296-307. This protocol is described as a bit mapped protocol. In it, N sequential time slots are allocated for contention by each of N stations on the local area network. Those stations which indicate a need to transmit are assigned in sequential order a time according to their station number in which to transmit a packet. Due to the serial nature of this protocol, its direct use in a module intgerconnecting backplane environment would involve substantial overhead in order to provide inband framing of the data so that stations could recognize the start and end of data. In addition, this publication details no method for determining when a reservation occurs or how to add or delete stations. Also, the protocol apparently requires some form of master station to initiate the reservation system during initialization.

In "The QPSX Man", by Newman et al., *IEEE Communications Magazine*, Apr. 1988, Vol. 26, No. 4, pp. 20-28, a Queued packet and synchronous switch Metropolitan area network is described. In this system, packets are continuously circulated on the network and when a station wishes to transmit, it finds a packet and marks it for use. The next time the packet comes around, the station places data in the packet. This is accomplished by counting the number of empty packets that pass the station going away from the master station. When the station wishes to transmit a packet, it freezes the empty packet counter and reserves a transmission spot. The station then counts down from this number, the number of empty packets that pass the station going toward the master station. When this count equals zero, the station transmits the packet.

In U.S. Pat. No. 4,700,341 to Huang, which is incorporated by reference, a plurality of positions for packets are provided in a fixed order. The beginning of a packet is signaled by a flag pattern. If a packet is not filled with information, the remainder of the packet is not transmitted but rather is immediately followed by the flag pattern for the next packet position.

The present invention utilizes a parallel bus structure, which provides for an out of band reservation signal, for transporting high speed data over a backplane bus interconnecting electronic circuit modules without need for a master to control such communication.

SUMMARY OF THE INVENTION

It is an object of the present invention to provide an improved packet (cell) transport mechanism for use in backplane communication between electronic modules.

It is another object of the present invention to provide a low overhead protocol for such data cell transport which is especially useful with ATM data.

It is an advantage that the present invention that very high efficiency is obtained as well as protection against failure of a single module disrupting communication among the remaining modules.

It is a further advantage of the present invention that the data lines of a module interconnection bus serve double duty thus reducing the number of physical interconnections between the modules.

It is a further advantage that modules can be plugged and unplugged from the bus without disruption of normal communication.

These and other objects of the invention will become apparent to those skilled in the art upon consideration of the following description of the invention.

In one embodiment of the present invention in which a system having a plurality of modules are interconnected by a common module communication bus, with each of the modules having a predetermined address, a method of controlling access to the communication bus, includes the steps of: providing a reservation line as part of the communication bus; signaling the occurrence of a reservation time slot over the reservation line; during the reservation time slot, each of the plurality of modules desiring transmission time on the communication bus placing a signal on a data/reservation bus in a position corresponding to its address; and establishing an order for transmission over the communication bus for each of the modules desiring transmission time. Preferably the method further includes the step of establishing the order based upon a number associated with each the address.

In an apparatus according to one embodiment of the present invention, for communication among a plurality of N modules, comprising in combination, a reserve line signals the occurrence of a reservation time slot during which time each of the N modules which have information to transmit may reserve a time for transmission over the bus. A plurality of at least N data lines are used for transmission of data words over the bus. Each of the N modules are also assigned use of one of the plurality of data lines for signaling, during the reservation time slot, that the module has information to transmit over the bus. The reserve line is also for signaling that a word of data being transmitted over the plurality of data lines is a last word in a current transmission to be transmitted by a module currently transmitting.

Another method of controlling access to a communication bus, includes the steps of: signaling the occurrence of a reservation time slot over a reserve line; reserving a transmission period during the reservation time slot by applying a predetermined logic level to one predetermined line of a data/reservation bus; determining a transmission number corresponding to the reserved transmission period; counting a number of the predetermined logic levels occurring on the reserve line; and transmitting over the data/reservation bus when the number of predetermined logic levels reaches the transmission number.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 1 is an overall block diagram of the architecture of a system of modules interconnected by a module interconnection bus according to the present invention.

FIG. 2 shows a more detailed breakdown of the module communication bus.

Figure 3A:
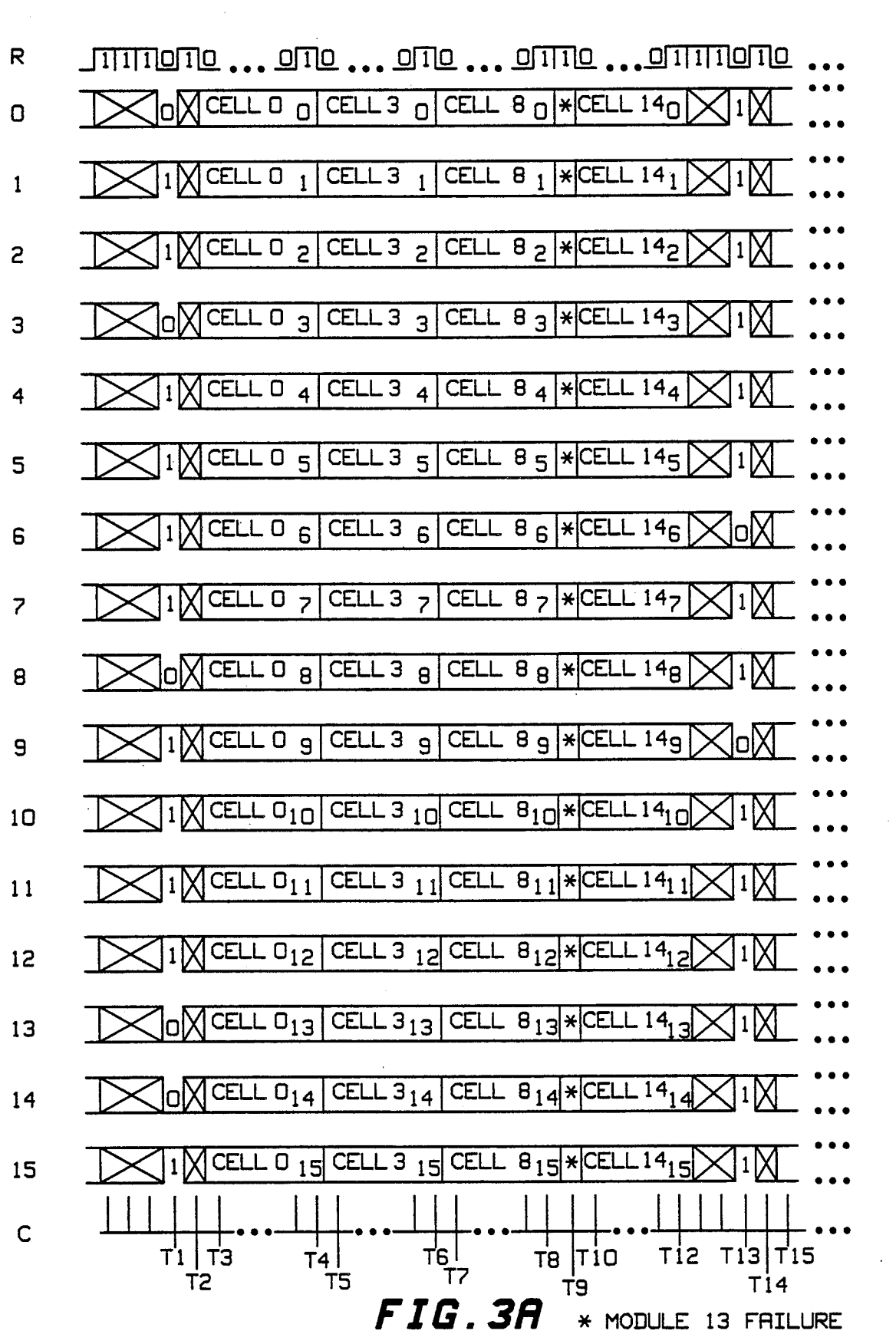

FIG. 3A and FIG. 3B shows a diagram illustrating the operation of the present protocol under several conditions.

FIG. 4 is an illustration of the layout of FIG. 3.

DETAILED DESCRIPTION OF THE INVENTION

Figure 3B:

Turning now to FIG. 1, an arrangement according to the present invention is shown in which a plurality of modules 20, 22, 24-50, in this example 16 such modules, are interconnected by a module communication bus 52. Each of the modules 20-50 has an internal address shown within the block as 0-15. Each bus connection for each module may be identical. Each module, according to the preferred embodiment, may be a card in a card cage or a module connected such as in U.S. patent application Ser. No. 07/042,186 to Buron et al. which is incorporated herein by reference. Such modules may, for example, include modems, multiplexers, DSU's, or other communication equipment which requires communication to other such local devices.

Turning now to FIG. 2, the bus structure of the present invention is shown in greater detail in connection with module 20. However, it is understood that the bus structure may be identical for each module. In the preferred embodiment, the bus structure uses a 16 bit data bus 54 having data lines numbered 0-15. This data bus is also used for the reservation protocol of the present invention as will be seen and is thus designated the data/reservation bus. By providing such double use of the data line, a separate set of lines for reservation functions (along with associated hardware such as connectors) are largely avoided. The data may be checked using a conventional parity line 56.

The bus structure also utilizes one or more reserve lines 60 in the preferred embodiment which is used in the reservation protocol as will be described later. In addition to this, one or more clock signals as required are provided on one or more clock lines 62. Various other control lines might also be provided as required for various other functions. Such control lines and the details of any multi-phase clock lines are omitted since they are not relevant to the present discussion.

In the protocol of the present invention, a reservation time slot is utilized for making bus reservations for each transmission cycle (For purposes of this document, the term "transmission cycle" is intended to mean a complete cycle as will be described comprising a reservation signal, a reservation time slot and a group of transmitted cells.). This reservation time slot is signaled by three consecutive ones on the reserve line 60. Using three consecutive ones to signal reservation eliminates the need for a master station which provides great advantages in high availability systems since all modules may power up and initialize independently.

Three consecutive ones are followed by a slot with zero on the reservation line (all modules place a zero on the reserve line 60) in which each module places a logic zero on the data/reservation bus corresponding to its internal address if it wishes to transmit. That is, if modules 0,4 and 7 wish to transmit and the remaining modules do not, then modules 0, 4 and 7 will place a logic zero on data/reservation bus at lines 0, 4 and 7 while the remaining modules will place logic ones on the data/reservation bus at lines 1-3, 5, 6 and 8-15 or allow those lines to float. In this manner, the data/reservation bus serves as part of the reservation function as well as conventional data transfer.

While the present invention will be described in conjunction with examples in which there are 16 modules connected to the bus, it is important to note that in this example, 16 (the number of data lines) is merely the maximum number of modules that can be connected without making other provisions (for example several consecutive reservation slots could be used to accommodate 32 such modules). There is no requirement that all 16 modules be present nor that they occupy any particular slots in the system in order for the invention to function. Thus, if only modules 2 and 14 for example are present, they can communicate in the same manner as if there were a full cage.

In the preferred embodiment, tri-state logic is used in the bus so that actually the modules which do not wish to transmit merely allow the output to float. All bus lines are normally at a logic one, that is, each line is at a logic one unless a module pulls it to a logic zero. Each end of the bus is terminated by the characteristic impedance of the bus line. It is also preferred that the logic signals appearing on the data bus take on a trapezoidal shape rather than rectangular so as to reduce the level of high frequency harmonic noise generated by the bus (For simplicity of illustration, FIG. 3 uses rectangular shaped logic signals.). Trapezoidal transceivers having reduced voltage swing and controlled slew rate (controlled rise and fall times) similar to those designed for the so called Futurebus (IEEE 896 Futurebus) Such as the National Semiconductor DS3896/DS3897 Trapezoidal TM transceivers may be used. Such trapezoidal transceivers are additionally more immune to changes in the bus impedance than some other types of drivers making it easier to operate in an environment wherein modules can be added and deleted from the system easily. Furthermore, by having the module outputs and inputs remain tri-stated until a reserve slot appears when initially plugged in, extraneous signals on the bus caused by plugging and unplugging modules in a live system are minimized.

After this reservation slot, there is one clock cycle of dead time (a dead slot) to allow the modules to compute the order of transmission of cells. If fast processing is available which can accomplish this function quickly enough, this dead slot may be eliminated. During this dead slot, the reserve line 60 is at its default logic one.

Following the dead slot, the first numbered (module 0 in the above example) module which requested transmission pulls the reserve line 60 to zero and begins transmitting. It transmits one packet (or cell in ATM terminology) over the parallel data bus, and during the last word of the cell's transmission it also releases the reserve line 60 to its normal logic one. This signals the next numbered module (number 4 in the above example) which has requested transmission time to begin transmission on the next clock cycle. Similarly, on the last word from module 4 in this example, module 4 releases the reserve line 60 to a logic one and module 7 begins transmission of a cell. When module 7 releases the reserve line 60 to logic one during the last word of transmission from the module, there are no further modules awaiting a transmission time. In essence, this results in all modules waiting for something to happen. Since the reserve line 60 is at a logic one in the meantime, three consecutive ones on three consecutive clock cycles on the reserve line 60 will occur signaling the next reservation slot.

In some embodiments, it is possible to provide a more robust reserve line 60 by providing redundant reserve lines. In such systems, two essentially identical reserve lines can be used with any conflict between the values on the reserve lines indicating a fault which can be detected and corrected with either manual intervention or possibly a reset of the system. In a preferred implementation of such a system, fault conditions are reported to a computer on the module which holds the module in an inactive state for three consecutive inactive reservation slots before resuming operation. This allows for detection of the error while allowing time for the fault to clear and the remaining transmitters on the module to finish transmission. Data held in the FIFO is not lost and can be transmitted on the next cycle. If three such reserve lines are provided, a voting system can be used to provide fault tolerance.

This procedure is described in connection with a second example in conjunction with FIG. 3 showing various features of the protocol. FIG. 3 is made up of FIG. 3A and FIG. 3B which may be placed side by side as shown in FIG. 4 to make a more complete picture. In this FIGURE, the X marks indicates don't care conditions or tri-state operation in which the line is floating. The clock signal C is for illustrative purposes only.

At startup, all modules are awaiting three consecutive sampled ones on the reserve line 60. Since none of the modules are pulling the reserve line 60 low, three consecutive ones will automatically occur when three time slots have passed. (Each tick of clock C represents a time slot.) In this manner, no master is required to initiate operation due to the natural state of the reserve line 60 and the fact that all modules are awaiting three consecutive ones. After three ones on the reserve line 60, each module that wishes to transmit places a logic zero on the data/reservation bus 54 at the location corresponding to its address while all modules simutaneously pull the reserve line 60 low. In this example, the reservation slot occurs at time T1 with modules with addresses 0, 3, 8, 13 and 14 indicating that they have a desire to transmit. The following slot at T2 is a dead slot which allows each module time to determine when it will be allowed to transmit.

At T3, module 0, being the module with the lowest numbered address wishing to transmit, begins transmission of a cell or packet (Cell 0, in the form of bits Cell $0_0$ through Cell $0_15$. In the preferred embodiment, the cells may be of variable length ranging from 3 to 37 words (two words for address and control and 1–35 words or fractional words for data), but fixed length cells or packets could also be used. At time T4, module 0 transmits the last word of cell 0 and releases the reserve line 60 to its normal logic one. This signals the next module that it is time to begin transmission. The next module will be the module with the next higher address number which signaled that it wished to transmit during the reservation slot. In this example, that will be module 3.

The use of variable length cells allows the designer to trade off storage delay (minimum amount of data required to transmit) for efficiency (data throughput/data throughput+overhead). This method of variable length cell transmission has advantages over QPSX which requires full cell transmission. To minimize storage delay in a QPSX system, cells are transmitted partially full leading to inefficiency. The use of variable length cells combined with the statistical nature of the present bus simplifies constraints in multi-master synchronous networks. Unlike conventional packet systems, ATM is designed to carry continuous bit oriented synchronous traffic (e.g. voice). Such systems are typlified by requiring a master clock. In networks with multiple master clocks, synchronization is virtually impossible. The present bus system is not required to be synchronized to any given clock source as a conventional TDM system is. This bus allows the passage of data within these networks to occur independently. The internetworking problem can be handled by known conventional as well as proprietary network independent clocking schemes.

At time T5, module 3 begins transmitting Cell 3 over the data bus lines 0–15. It continues through time T6 at which time module 3 releases the reserve line 60 and transmits its last word signaling that the next module can begin transmission during the next slot.

Module 8 is the next numbered module which signaled that it wished to transmit during the reservation slot and thus begins transmitting at time T7. Module 8 transmits Cell 8 over the data bus lines 0–15 until time T8 at which time it transmits its last word and releases the reserve line 60 to its normal logic one state signaling that the next numbered module which requested to transmit may begin at time T9.

For the next part of this example, let us assume that some time between times T1 and time T8 module number 13 has experienced a failure. Thus module 13 is unable to transmit in its designated turn beginning at time T9. Assuming the module's failure mode does not pull the reserve line 60 to a logic zero, the next time slot T10 will also have a logic one at the reserve line 60. This serves, as usual, to signal the next numbered module requesting transmission time that it is time for it to transmit and thus module 14 begins transmitting Cell 14 over the data bus.

Thus, the current protocol provides an inherent level of protection against module failure disrupting communication among other modules. At this point, when the error is detected a new module may be plugged into the slot for module 13 without powering down the entire system. The new module simply waits for the next occurrence of three consecutive ones on the reserve line 60 and begins normal operation without any sort of startup procedure needed in general. In the worst case, multiple consecutive module failures force the bus to reenter the reservation mode.

At time T12, module 14 transmits its last word of cell 14 and releases the reserve line 60 to logic one. Since only modules 0, 3, 8, 13 and 14 requested to transmit on this cycle, there is no further transmission to occur. Therefore, no module pulls the reserve line 60 to logic zero. This being the case, the next two clock cycles will have logic ones at the reserve line 60 providing the required three consecutive ones to signal the next reservation slot. This slot occurs at time T13 during which modules 6 and 9 are requesting transmission time by placing logic zeros on the bus. This is followed by the dead slot at time T14 and the beginning of transmission of Cell 6 at time T15. (Note that a second consecutive failure will result in a reservation slot.)

At time T16, module 6 transmits the last word of Cell 6 and releases the reserve line 60 to logic one. Module 9 thus begins transmission of Cell 9 at time T17. Since module 9 is the last module requesting transmission time during this cycle, there is no module to pull the reserve line 60 to a logic low at time T19. The result is three consecutive logic ones starting at time T18 so that another reservation slot occurs at time T20.

During the reservation slot of T20, no modules request transmission time. This condition illustrates the idle pattern of the reserve line 60 which takes the following form:

1110111011101110...

In this pattern, each zero represents a reservation slot. Whenever a module requires transmission time in this condition, it has merely to wait a maximum of four time slots to access a reservation slot. Thus acquisition delay under lightly loaded conditions are minimized by use of the out of band reservation signaling.

At time T21, a reservation slot occurs in which each of the 16 modules requests transmission time. This condition results in maximum loading of the bus. At time T22 the first module, module 0, begins transmitting Cell 0. It ends at time T23 with the release of the reserve line 60 followed by the beginning of transmission of Cell 1 by module 1. This process proceeds through each of the 16 modules until time T24 where the last of the modules, module 15, begins transmission of Cell 15. At time T25, Cell 15 is completed with the release of the reserve line 60 to a logic one which will be the first of three consecutive ones signaling a new reservation slot. In this last cycle, it can be seen that the overhead as measured by time slots not used to carry Cells reduces to:

$$\text{Overhead} = \frac{5}{\sum_{i=0}^{N} \text{(length of Cell } i)}$$

Where N is the number of modules.

In the case where each cell is an average of 256 bits long (16 words) and there are 16 modules, this reduces to:

$$\text{Overhead} = \frac{5}{16 * 16}$$
$$= 0.0195$$

In the case where only one Cell is transmitted in a cycle this overhead increases to:

$$\text{Overhead} = \frac{5}{16}$$
$$= 0.3125$$

Since this fixed overhead is distributed over large numbers of cells when heavily loaded and fewer cells when lightly loaded, the net result is an adaptive system which gets more efficient under heavier loading conditions.

In the preferred embodiment, the present invention is implemented with dedicated hardware in the form of ASIC circuits or other custom or semi-custom integrated circuits. Since the prime utility of this invention is for systems requiring several hundred megahertz of bandwidth on the module communication bus, it is currently impractical to provide the functions required to implement the system in software or firmware. However, this does not preclude such an implementation in software when practical or implementing such a system at lower speeds where microprocessor technology can readily handle the tasks. In such a microprocessor implementation, or indeed in a hardware based system, the operation of reserving a transmission time and transmitting a cell may be carried out in accordance with the flow chart of FIG. 5.

Figure 5:
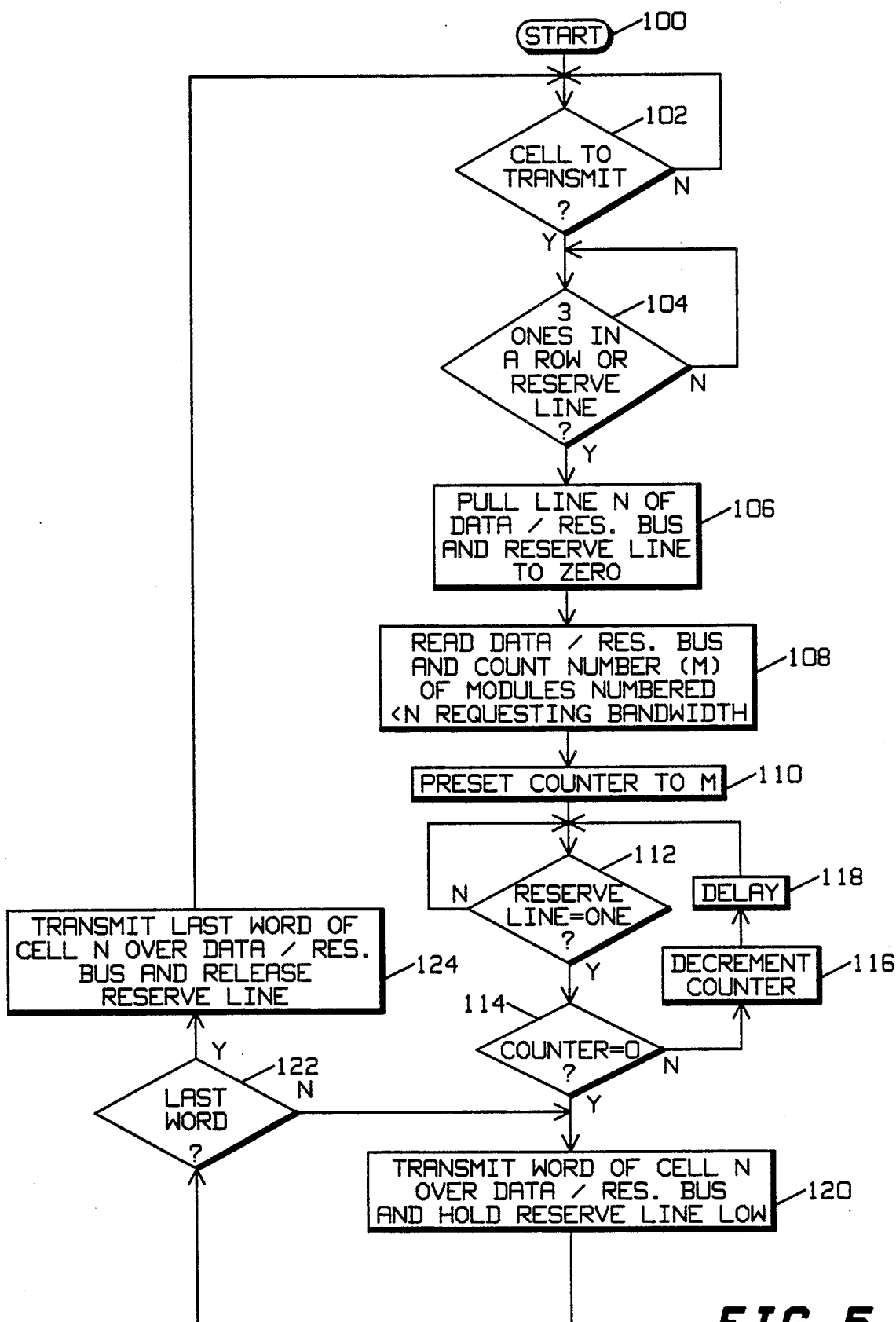
FIG. 5 is a flow chart showing the operation of a module in the transmit mode according to the present invention.

Referring to FIG. 5, the process begins at step 100 with power-up and initialization of the module. At decision block 102, the module determines if it has a cell to transmit. If not, the process waits at step 102 until it does. If it does have a cell to transmit, control passes to decision block 104 where the module waits for three consecutive ones to appear on the reserve line 60. When they appear, the module (module N) pulls line N of the data/reservation bus to a logic zero at step 106.

The module reads the data/reservation bus 54 at step 108 and counts a number M of modules with module numbers less than N who have also pulled a line of the data/reservation bus 54 to logic zero. Control then passes to step 110 where a counter is preset to M. Control then passes to decision block 112 where the module waits for the reserve line 60 to be released to a logic one. After release to logic one, control passes to decision block 114 where the value of the counter is checked. If the counter is not at zero, control passes to step 116 where it is decremented. After a delay for the next slot at 118, control passes back to block 112. If the counter is at zero at 114, control passes to step 120 where cell N is transmitted over the data/reservation bus 54 while holding the reserve line 60 at a logic zero. From step 120, control passes to decision block 122.

At step 122, the module determines if the next word to be transmitted is to be the last word of the cell (This presumes that no cell is shorter than two words but can be easily modified to accept one word cells). If not, control returns to step 120. If the next word is the last word at 122, then control passes to step 124 where the last word is transmitted while releasing the reserve line 60 to its normal logic high. Control then reverts back to step 102.

Figure 6:
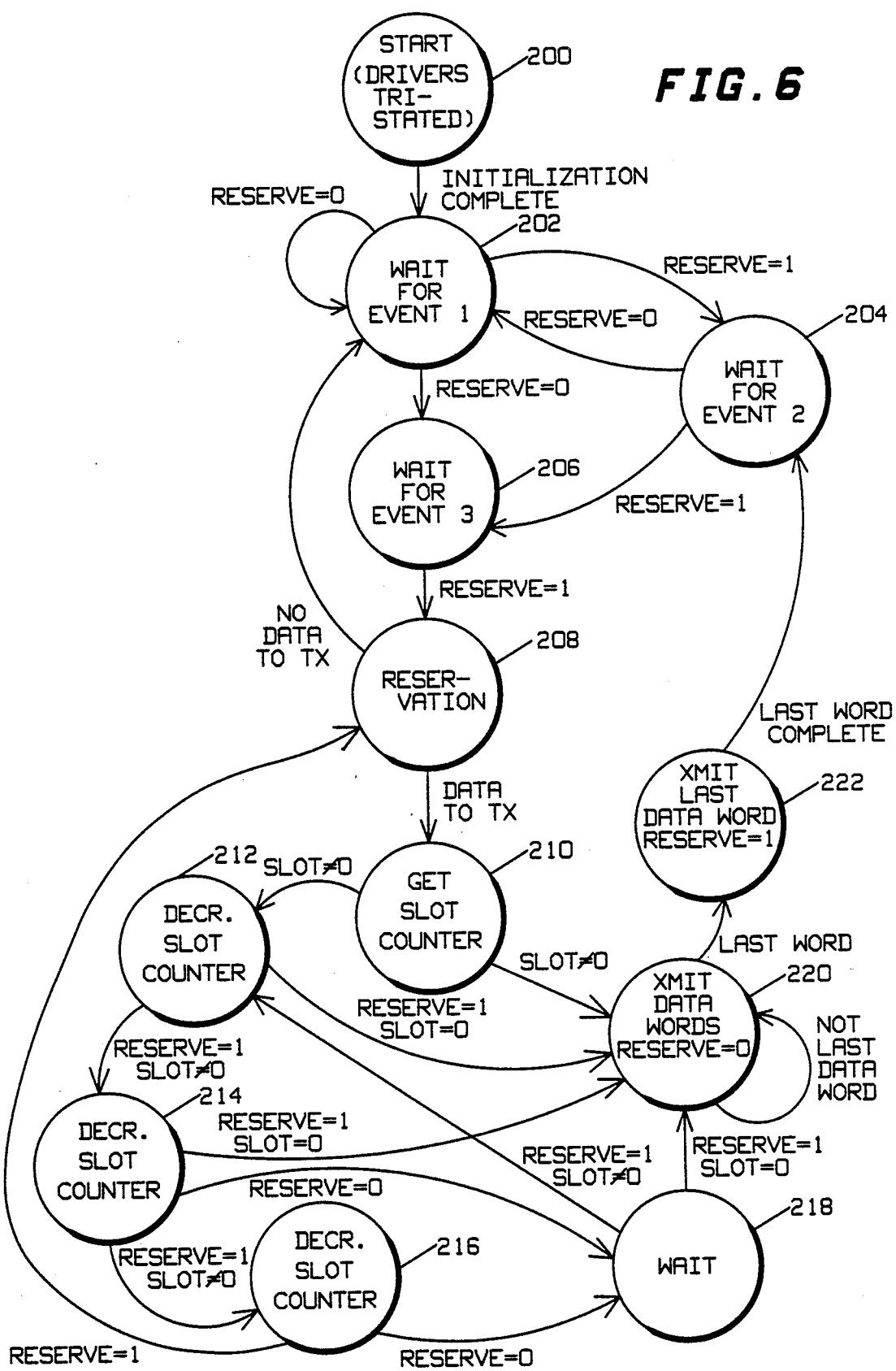
FIG. 6 shows a state diagram for a reservation state machine which operates according to the present invention.

Turning now to FIG. 6, a state diagram for a bus reservation state machine is shown. FIG. 6 describes the operation of a reservation state machine, shown as reservation state machine 300 in FIG. 7, in terms of the states and events that are associated with data transmission on the module communication bus 52 of FIG. 1. This is a synchronous state machine since each state lasts at least one clock cycle and the events are sampled once per clock cycle.

Beginning at state 200, when initialization of all functions is complete, the reservation state machine 300 transitions to state 202. In this state, the reservation state machine 300 is awaiting the first of three consecutive events signified by the reserve signal in the logic one or high condition. As long as the reserve signal is at logic zero, the reservation state machine 300 stays in state 202.

Upon detection of reserve=logic one, (first event) the reservation state machine 300 moves to state 204. If on the next cycle the reserve signal is observed to be zero again, the reservation state machine 300 reverts back to state 202. On the other hand, if the reserve is again detected to be a logic one (second event), the reservation state machine 300 transitions to state 206. Again, if the reserve signal is seen to be a logic zero, the reservation state machine 300 reverts back to state 202. If the reserve signal is detected as a logic one (third event), a reservation slot is triggered and the reservation state machine 300 moves to state 208. In state 208, the reservation occurs as described previously. The reservation state machine 300 drives the reserve signal to a logic zero and if there is data to transmit, the reservation state machine 300 moves to state 210; otherwise, it returns to state 202 where it once again awaits the three consecutive events.

At state 210, the number of modules reserving with slot numbers less than the current module is computed (hereinafter referred to as SLOT). If SLOT is equal to zero (first in line to transmit), the reservation state machine 300 moves to state 220 where it immediately begins to transmit a cell. Else, if there is at least one module having reserved time ahead of the current module, the reservation state machine 300 moves to state 212. At state 212, the SLOT counter is decremented and the reservation state machine 300 waits for the reserve signal to go to a logic one. As long as the reserve signal is zero the reservation state machine 300 will remain in state 212. The SLOT counter is only decremented upon entering state 212.

At state 212 when a reserve=logic one is detected, and if the SLOT counter is equal to 0 (next in line to transmit), the reservation state machine 300 transitions to state 220. However, if reserve=logic one but the SLOT counter is not 0 (not next to transmit), the reservation state machine 300 proceeds to state 214. At state 214, if the reserve signal goes to logic zero indicating that another module is transmitting, the reservation state machine 300 moves to state 218. Again if the reserve signal is detected as logic one (the next module in line did not transmit for some reason) and the SLOT counter is 0 (next in line to transmit), the reservation state machine 300 proceeds to state 220. The effect is that the module which failed to transmit is skipped over. If the slot counter is not 0, the reservation state machine 300 proceeds to state 216.

At state 216, the reservation state machine 300 has detected two consecutive reserve signals and is awaiting a third. If the reserve signal is again detected as a logic one (three in a row), a reservation slot is triggered and the reservation state machine 300 reverts back to state 208 without regard for the slot counter. On the other hand, if the reserve line 60 is seen as a logic zero this time (a module has been skipped over because it did not transmit), the reservation state machine 300 moves to state 218 where it remains as long as the reserve line 60 is at logic zero.

At state 218, when the reserve line 60 is detected as a logic one, the reservation state machine 300 transitions back to state 212 if the SLOT counter is not 0 (next in line to transmit). However, if the SLOT counter is 0 (next in line to transmit), the reservation state machine 300 proceeds to state 220.

State 220 is where actual data transfer takes place. As long as there is data to transmit, the reservation state machine 300 remains at state 220 driving the reserve line 60 to logic zero. Upon the last word to transmit, the reservation state machine 300 moves to state 222 where the reserve line 60 is driven to a logic one and the last data word is applied to the bus 54. Upon completion of the last data word, the reservation state machine 300 reverts back to state 204 since it must include the transmission of its last word as the first event to allow for the case of it being the last to transmit before the next reservation cycle.

Figure 7:
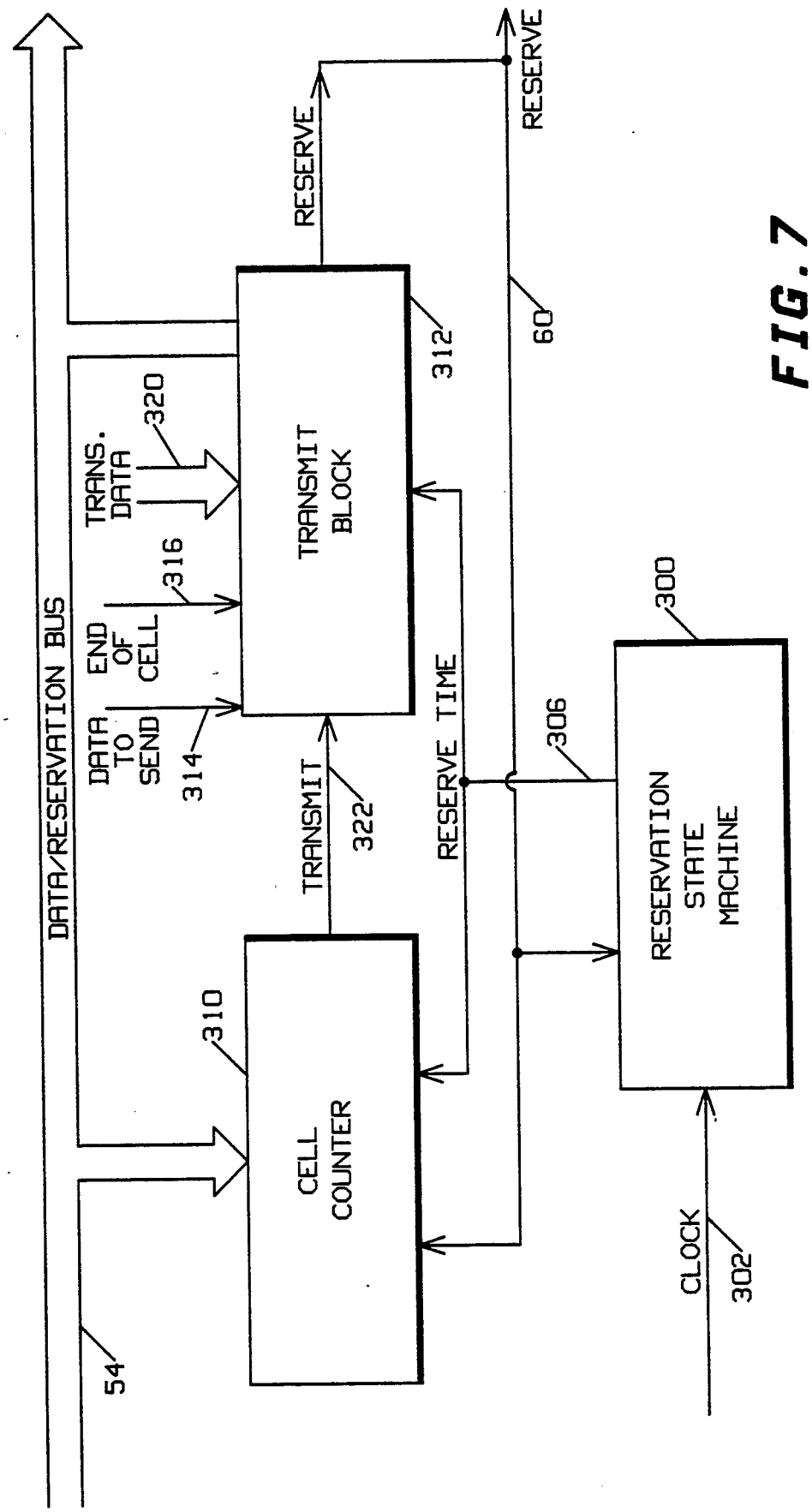
FIG. 7 is a block diagram of a preferred implementation of the present invention.

The reservation state machine whose operation is as described in FIG. 6 is shown as 300 in FIG. 7. The reservation state machine 300 receives a clock signal which is present on the module communication bus 52 or is locally generated over a fast clock line 302 and monitors the reserve signal on reserve line 60. When the reserve line 60 has produced three consecutive ones, the reservation state machine generates a reserve time signal 306 which is provided to a cell counter 310 as well as a transmit block 312. Transmit block 312 is the source of the reserve signal on reserve line 60. Both the cell counter 310 and the transmit block are coupled to the data/reservation bus 54 with the cell counter 310 monitoring the bus and the transmit block placing data or reservation signals on the bus. Not shown is a transmit buffer (FIFO) which provides signals to the transmit block indicating that it has data to send 314, that the end of a cell has been reached, and a parallel bus 320 for passing data from the buffer to the transmit block.

The cell counter 310 does essentially what the name implies and counts the number of cells that have passed since the last reserve time. When the proper number of cells has passed, cell counter 310 activates a transmit line 322 which is coupled to the transmit block 312. When transmit block 312 detects the activation of transmit line 322, it begins loading data from the buffer over the transmit data bus 320. When the end of the cell is reached as indicated by line 316 from the buffer, the transmit block 312 activates the reserve line 60 by driving (releasing) it to a logic one while transmitting the last word of the cell.

Figure 8:
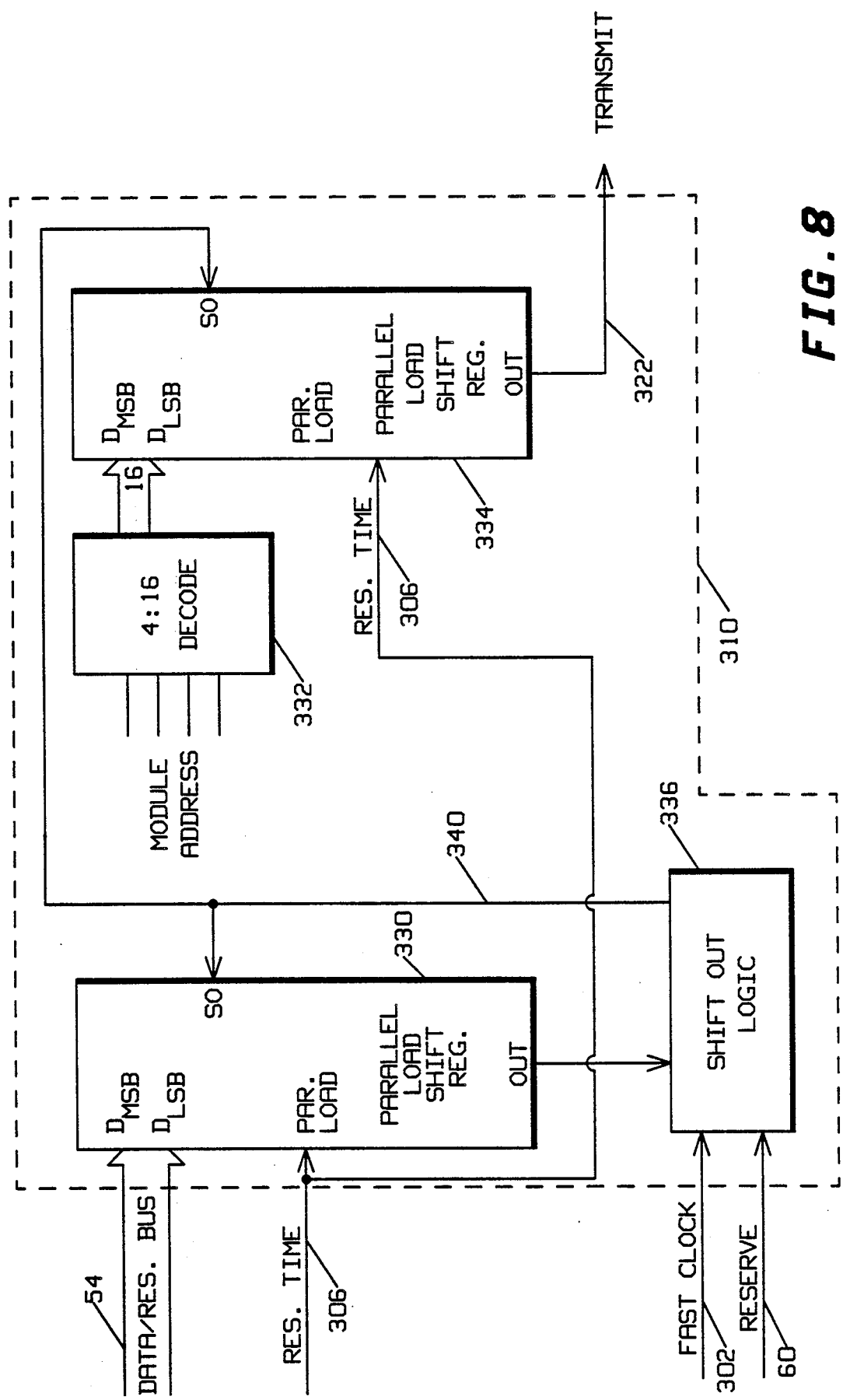
FIG. 8 is a block diagram of the Cell Counter of FIG. 7.

Turning now to FIG. 8, the cell counter of FIG. 7 is shown in greater detail. The data/reservation bus 54 is applied to the data input lines of a parallel load shift register 330 which performs a parallel load of the bus during the reserve time as indicated by the reserve time line 306. A 4:16 decoder 332 translates a four bit module address stored on the module into a single one of sixteen lines at a logic one level which drives a second parallel load shift register 334.

A shift out logic circuit 336 receives the output of the shift register 330 in serial form. When the reserve line 60 is enabled, the shift out logic controls the shift out (SO) line 340 to cause the shift registers 330 and 334 to simultaneously and rapidly count down to the next position containing a logic one. The rapid count down is at the rate of fast clock 302 which in this example is at least 16 times as fast as the rate of time slots. When the shift register 334 shifts the module address, as translated by the decoder 352, to the output 322, the output will shift to a logic one indicating that it is time for the current module to transmit a cell.

Figure 9:
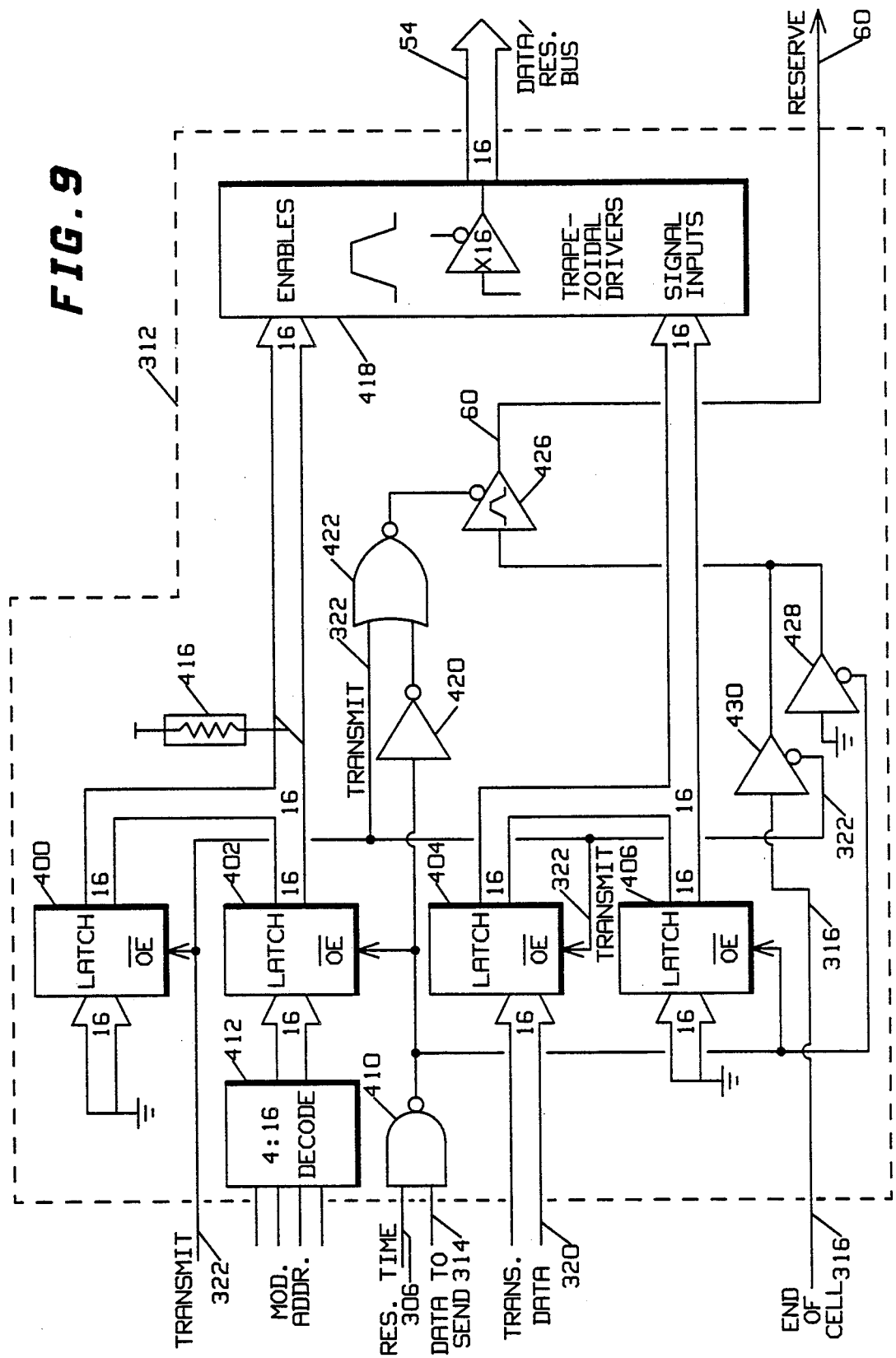
FIG. 9 is a logic diagram of the transmit block of FIG. 7.

Turning now to FIG. 9, the transmit block 312 of FIG. 7 is shown in greater detail. This block 312 operates in three different modes: reservation mode, data transfer mode, and idle mode. The transmit block 312 includes four sixteen bit wide latches 400, 402, 404 and 406. The outputs of each of these latches are controlled by an output enable (OE) input for each latch. The OE of latches 400 and 404 are enabled simultaneously by the transmit line 322. Similarly, the OE of latches 402 and 406 are enabled simultaneously by the output of a logic NAND gate 410 with two inputs: reserve time line 306 and data to send line 314. Latches 400 and 406 have all inputs grounded to a logic zero. Latch 402 receives its input from the output of a 4:16 line decoder 412 which converts the four bit module address to a one of sixteen line output with the one active line at a logic zero. (This function may be merged with that of decoder 352 if desired by inverting the output of decoder 352). The outputs of latches 400 and 402 form a common bus which is 16 bits wide and drives the enable lines of a bank 418 of 16 trapezoidal drivers in the preferred embodiment. A bank 416 of pull-up resistors are coupled to the bus driving the bank 418 of driver's enable lines. The signal inputs of the trapezoidal drivers is provided by the combined outputs of latches 404 and 406. The output of the trapezoidal drivers form the data/reservation bus 54.

The output of the NAND gate 410 also drives an invertor 420 which in turn drives a first input of a NOR gate 422. The second input of the NOR gate 422 is driven by the transmit line 322. The output of the NOR gate 422 provides the enable signal for a driver 426 which provides reserve line 60 at its output. The input of the driver 60 is driven by the outputs of drivers 428 and 430. Driver 428 has its input grounded and its enable driven by the output of NAND 410 while driver 430 is enabled by transmit line 322 and receives its input from the end of cell line 316.

In the reservation mode of operation, latches 402 and 406 are enabled by the output of NAND 410. This causes a logic zero representing the address of the current module to pass to the appropriate enable line of the trapezoidal drivers. The remaining trapezoidal drivers 418 will remain not enabled. Since all inputs of latch 16 are at ground, a zero is placed on the bus at the position corresponding to the address of the current module.

In the data mode of operation, latches 400 and 404 are enabled and the data arriving at latch 404 is passed on to the trapezoidal drivers 418 by virtue of all of the lines of the drivers 418 being enabled.

In the idle mode of operation, none of latches 400, 402, 404 and 406 are enabled.

Figure 10:
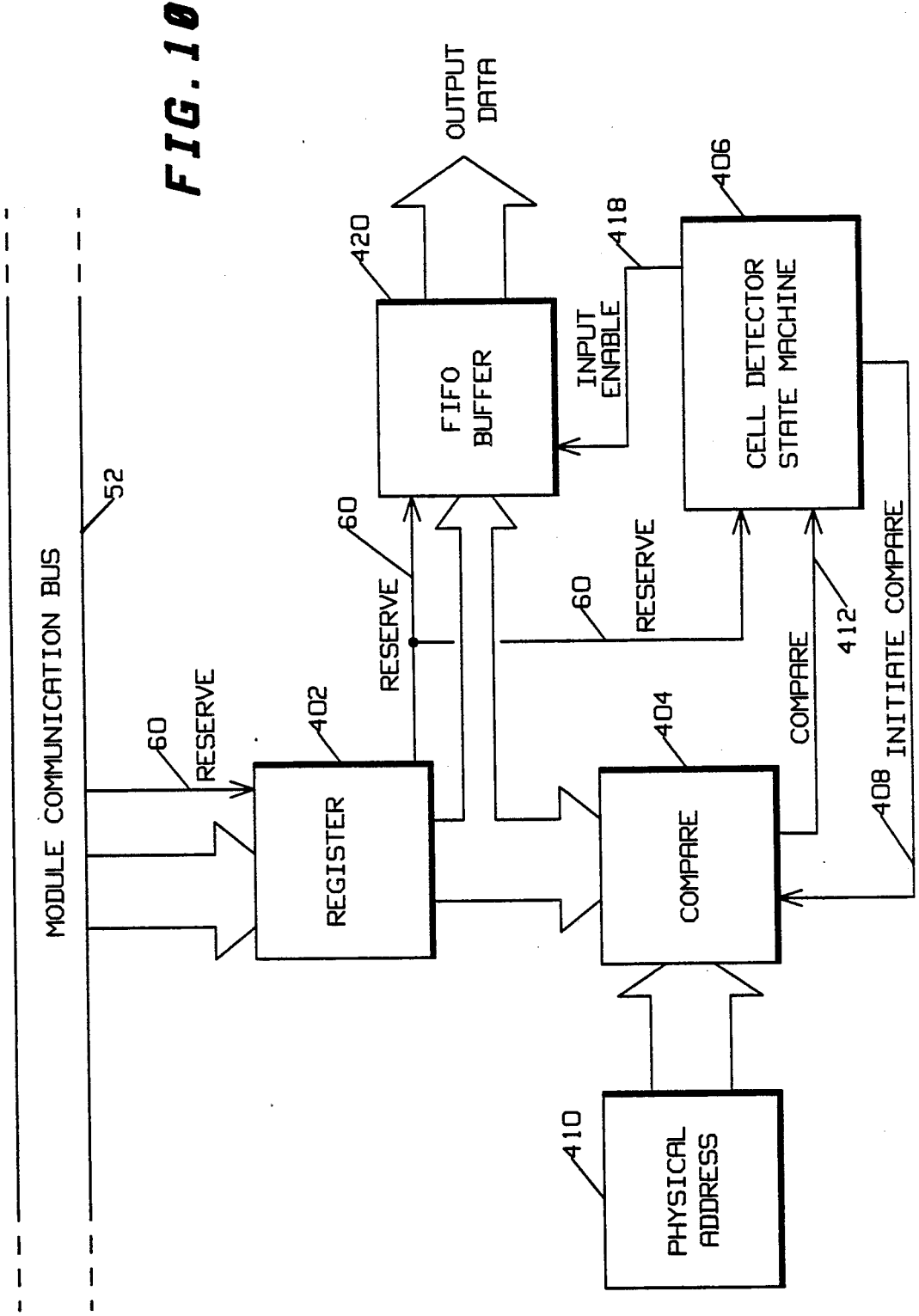
FIG. 10 is a block diagram of a receiver attached to the module communication bus of the present invention.

Turning now to FIG. 10, a receiver is shown connected to the module communication bus 52 of FIG. 1. In this example receiver, data are constantly received by a register 402 from bus 52. The reserve line 60 is shown broken out separately since it is used by the receiver separately. Register 402 is preferably an edge triggered register, but this is not limiting. Data passes through the register to a compare circuit 404. The compare circuit looks at the first word of each cell under the instructions of a cell detector state machine 406 (via the initiate compare line 408). The compare circuit 404 compares this first word, which in the preferred embodiment contains the equivalent of a destination address of the cell, with a physical address 410. This physical address may be an address associated with a physical location in the card cage or may come from an assignment from a processor or memory circuit or result from a strapping of the module, etc.

If the physical address 410 and the cell address match, the compare circuit puts out a logic one on the compare line 412. Otherwise, this compare signal remains at a logic zero. When the compare lines and the reserve lines 60 result in detection by the cell detector state machine 406 that the current cell is destined for the current receiver, the cell detector sends an input enable signal 418 to a FIFO type buffer memory 420. This input enable signal enables the FIFO buffer 420's inputs so that data from the register 402 are allowed to begin filling the buffer 420. This operation continues until the end of the cell is detected. The buffer 420 may then provide the cell's data as output to the desired destination device.

Figure 11:
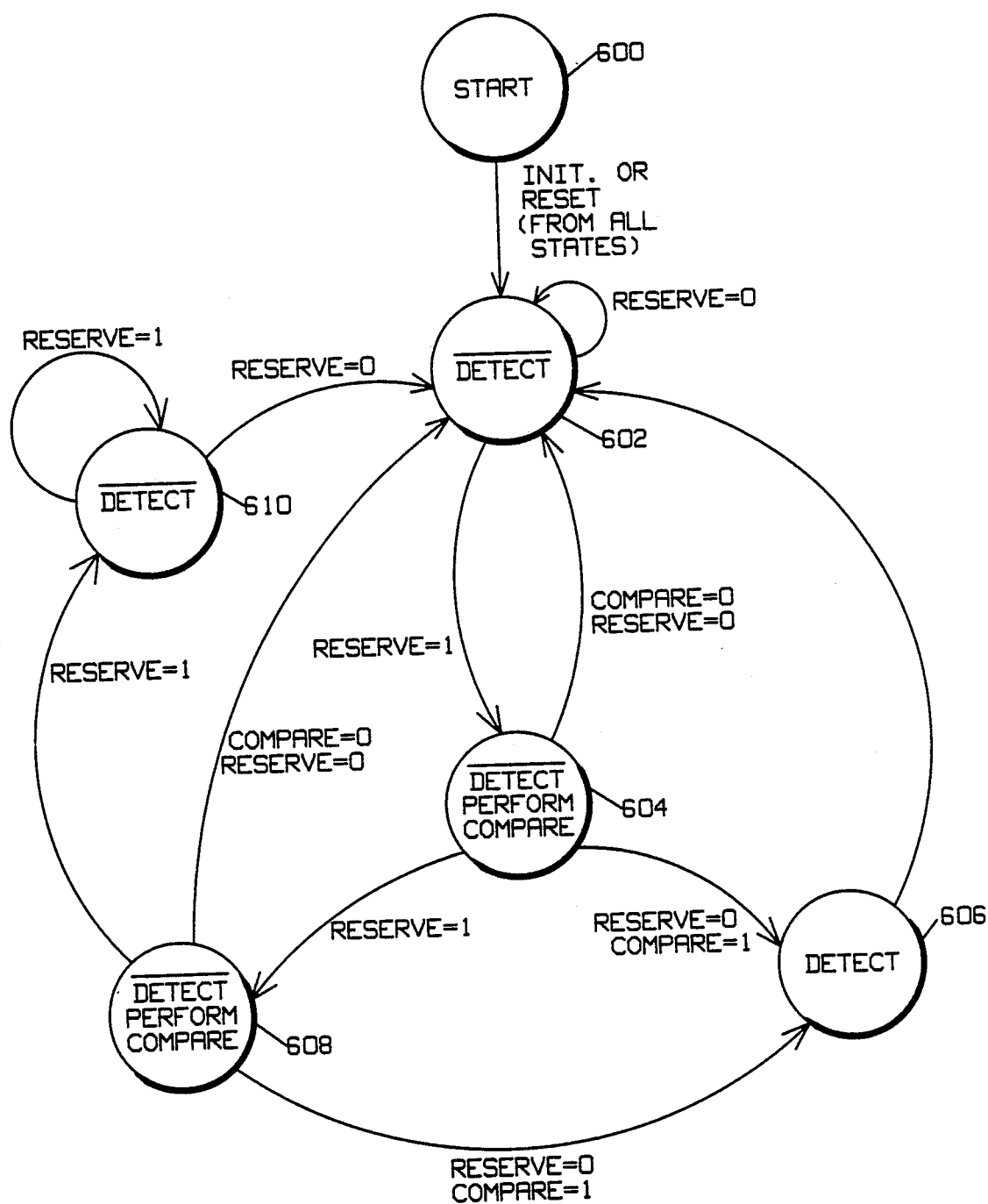
FIG. 11 is a state diagram describing operation of the receiver of FIG. 10 according to the present invention.

The operation of the cell detector state machine 406 is described by the state diagram of FIG. 11 in terms of the states and events that are associated with the detection and reception of data cells on the module communication bus 52. This is a synchronous state machine since each state lasts at least one clock cycle and the events are sampled once per clock cycle. The receiver described by this state machine in conjunction with the block diagram of FIG. 10, it should be noted, are independent of the transmitter operation as described earlier.

There are two inputs to the cell detector state machine 406, namely the reserve signal as described earlier and a compare signal from compare block 404 as described earlier which provides an indication of the outcome of a comparison of the physical address 410 and the cell's destination address. The cell detector state machine 406 also has two outputs, namely initiate compare 408 which is a delayed version of reserve line 60 in the present embodiment, and input enable 418 (detect) which turns on the inputs of the buffer 420 or otherwise enables the flow of a cell to its destination.

Beginning at state 600, when initialization of all functions is complete, or upon detection of a reset condition from any state described hereafter, the cell detector state machine 406 transitions to state 602. In this state the cell detector state machine 406 is waiting for the reserve signal to be detected as a logic one and the input enable remains inhibited (detect is at logic zero). As long as the reserve signal is at a logic zero, the cell detector state machine 406 remains in state 602.

Upon detecting that the reserve signal has changed to a logic one, the cell detector state machine 406 moves to state 604 where the state machine issues an initiate compare signal and the input enable remains inhibited. This condition indicates that the last word of a cell (end of cell condition) has been transferred. At state 604 the address comparison is made as indicated above. If on the next cycle the reserve signal is observed to be a logic zero again, and the compare signal is a logic one (indicating a match between the physical location address and the cell destination address, i.e. the cell is destined for the current receiver), then the cell detector state machine 406 transitions to state 606 and the cell is accepted. On the next clock cycle at state 606, the cell detector state machine 406 transitions back to state 602 in preparation for the next end of cell condition.

At state 604, if the reserve signal is detected to be a logic zero, but compare is at a logic zero, then the cell detector state machine 406 reverts back to state 602 since the cell is destined for a different device. If the reserve signal is seen as a logic one (second consecutive occurrence), the cell detector state machine 406 will move to state 608. This occurs when a module asserts a reservation but fails to transmit in turn.

At state 608, the address comparison is again performed in order to detect a cell immediately following a failed transmission. If the reserve line 60 returns to logic zero and the compare signal is at a logic one, the cell detector state machine 406 moves to state 606 where the cell is accepted by sending a logic one over input enable line 418. If, however, the reserve signal is again observed to be logic one (third consecutive occurrence), the cell detector state machine 406 goes to state 610. At this point, barring a fault or failure, a reservation is taking place within the reservation state machine. During the reservation time the reserve line 60 should be detected as logic zero and the cell detector state machine 406 will revert back to state 602 to prepare for detection of a cell. On the other hand, the cell detector state machine 406 will remain at state 610 as long as reserve is at logic one.

The above discussion presumes that the data is transferred in increments of 16 bits and that a maximum of 16 modules is provided. Those skilled in the art will appreciate that this invention could also be implemented using an 8 bit bus with 8 modules maximum or a 32 bit bus with 32 modules maximum or other similar configurations as required without departing from the present invention. Similarly, various techniques can be readily devised to expand the number of modules for a given bus size if desired (for example, consecutive reservation slots used for several groups of modules could be used). However, in the preferred embodiment, the maximum number of modules is not considered a limitation due to the fact that 16 is a reasonable number of modules to interconnect with a single backplane. Furthermore, by restricting the number of modules, any serious failure of the bus can be more readily isolated. In addition, by limiting the number of modules, backplane delay is also held to a reasonable amount.

Those skilled in the art will appreciate that although the above description has been provided assuming positive logic and particular logic states, the inverse states or negative logic could be used with equal success.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. In system having a plurality of modules interconnected by a common module communication bus, with each of said modules having a predetermined address, a method of controlling access to said communication bus, comprising the steps of:
   providing a reserve line as part of said communication bus;
   signaling the occurrence of a reservation time slot over said reservation line;
   during said reservation time slot, each of said plurality of modules desiring transmission time on said communication bus placing a signal on a data/reservation bus in a position corresponding to its address; and
   establishing an order for transmission over said communication bus for each of said modules desiring transmission time.

2. The method of claim 1, further comprising the step of establishing said order based upon a number associated with each said address.

3. The method of claim 1, wherein another reservation time slot occurs after transmission by a last module in said order, said reservation time slot being signaled by a succession of time slots having a predetermined signal on said reservation line.

4. The method of claim 3, wherein said predetermined signal is a default signal which is changed when any of said modules transmits.

5. The method of claim 4, further comprising the step of releasing said reserve line to said default signal during a last word transmitted by any of said modules to signal that the next module, if any, in said order may transmit.

6. An apparatus for communication among a plurality of N modules, comprising in combination:
   a reserve line for signaling the occurrence of a reservation time slot during which time each of said N modules which have information to transmit may reserve a time for transmission over said bus;
   a plurality of at least N data lines used for transmission of data words over said bus;
   each of said N modules also being assigned use of one of said plurality of data lines for signaling, during said reservation time slot, that said module has information to transmit over said bus; and
   said reserve line also for signaling that a word of data being transmitted over said plurality of data lines is a last word in a current transmission to be transmitted by a module currently transmitting.

7. The apparatus of claim 6, wherein said reserve line is normally in a first logic state and wherein said signaling that a word of data being transmitted is said last word is accomplished by driving said reserve line to a second logic state.

8. The apparatus of claim 6, further comprising means for assigning an order for transmission of each of said modules signaling that it has information to transmit.

9. The apparatus of claim 8, wherein said order is assigned depending upon a number assigned to a physical location of said module.

10. A method of controlling access to a communication bus, comprising the steps of:
   signaling the occurrence of a reservation time slot over a reserve line by applying a predetermined logic level to said reserve line during a last word of a transmission;
   reserving a transmission period during said reservation time slot by applying a predetermined logic level to one predetermined line of a data/reservation bus;
   determining a transmission number corresponding to said reserved transmission period;
   counting a number of said predetermined logic levels occurring on said reserve line; and
   transmitting over said data/reservation bus when said number of predetermine logic levels reaches said transmission number.

11. The method of claim 10, wherein said step of signaling is accomplished by the occurrence of three consecutive predetermined logic levels.

12. The method of claim 10, wherein said transmission number is determined by the step of counting a number of predetermined logic levels on said data/reservation bus at bit positions less than a predetermined bit position.

* * * * *